(12) United States Patent
Izumi et al.

(10) Patent No.: US 10,610,830 B2
(45) Date of Patent: Apr. 7, 2020

(54) HONEYCOMB STRUCTURE

(71) Applicant: NGK INSULATORS, LTD., Nagoya (JP)

(72) Inventors: Yunie Izumi, Nagoya (JP); Kenji Morimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/461,787

(22) Filed: Mar. 17, 2017

(65) Prior Publication Data

US 2017/0282125 A1   Oct. 5, 2017

(30) Foreign Application Priority Data

Mar. 30, 2016 (JP) ................. 2016-068417

(51) Int. Cl.
*B01J 23/00* (2006.01)
*B01D 53/94* (2006.01)
(Continued)

(52) U.S. Cl.
CPC ....... *B01D 53/9427* (2013.01); *B01D 53/944* (2013.01); *B01D 53/9477* (2013.01); *B01J 23/34* (2013.01); *B01J 23/83* (2013.01); *B01J 35/04* (2013.01); *F01N 3/0222* (2013.01); *F01N 3/035* (2013.01); *F01N 3/106* (2013.01); *F01N 3/2842* (2013.01); *B01D 53/9418* (2013.01); *B01D 53/9431* (2013.01); (Continued)

(58) Field of Classification Search
CPC .... F01N 3/2842; F01N 3/106; F01N 2370/02; B01J 35/04; B01J 23/8892

USPC ........................................................ 502/324
See application file for complete search history.

(56) References Cited

U.S. PATENT DOCUMENTS 6,701,707 B1    3/2004 Upadhyay et al.
2004/0040284 A1 3/2004 Upadhyay et al.
(Continued)

FOREIGN PATENT DOCUMENTS

JP    H05-195756 A    8/1993
JP    2004-100699 A   4/2004
(Continued)

OTHER PUBLICATIONS

Kim, D.S., Kim, Y.H., Yie, J.E. et al., "NO Oxidation over Supported Cobalt Oxide Catalysts" Korean J. Chem. Eng., 27(1), 49-54 (Feb. 16, 2010) (Year: 2010).*

(Continued)

*Primary Examiner* — Haytham Soliman
(74) *Attorney, Agent, or Firm* — Burr & Brown, PLLC

(57) ABSTRACT

A honeycomb structure includes: a honeycomb structure body including a plurality of cells; and a plugging portion to alternately plug open end parts of the plurality of cells on one side as an inflow side of the exhaust gas and open end parts on the other side as an outflow side of the exhaust gas. The partition wall is loaded, on the side of the outflow cells, with an oxidation catalyst made of a transition metal oxide to oxidize NO gas or an oxidation catalyst made of a transition metal oxide loaded at $CeO_2$ to oxidize NO gas. The partition wall has porosity of 70% or less, the oxidation catalyst has a particle diameter of more than 1 μm and less than 50.0 μm, and the loading amount of the oxidation catalyst is 5.0 g/L or more and 50 g/L or less.

5 Claims, 3 Drawing Sheets

(51) Int. Cl.
    *B01J 23/34*     (2006.01)
    *F01N 3/035*     (2006.01)
    *F01N 3/022*     (2006.01)
    *B01J 23/83*     (2006.01)
    *B01J 35/04*     (2006.01)
    *F01N 3/10*     (2006.01)
    *F01N 3/28*     (2006.01)
    *B01J 37/00*     (2006.01)
    *B01J 37/02*     (2006.01)
    *F01N 13/00*     (2010.01)
    *B01J 35/00*     (2006.01)
    *B01J 35/10*     (2006.01)
    *F01N 3/20*     (2006.01)
    *B01J 35/02*     (2006.01)

(52) U.S. Cl.
CPC ............. *B01D 2255/2065* (2013.01); *B01D 2255/2073* (2013.01); *B01D 2255/20738* (2013.01); *B01D 2255/20746* (2013.01); *B01J 35/002* (2013.01); *B01J 35/023* (2013.01); *B01J 35/1014* (2013.01); *B01J 35/1019* (2013.01); *B01J 37/0018* (2013.01); *B01J 37/0215* (2013.01); *F01N 3/2066* (2013.01); *F01N 13/009* (2014.06); *F01N 2330/06* (2013.01); *F01N 2370/02* (2013.01); *F01N 2610/02* (2013.01); *F01N 2610/1453* (2013.01)

(56) References Cited

U.S. PATENT DOCUMENTS

| | | | |
|---|---|---|---|
| 2007/0020155 A1* | 1/2007 | Ohno | B01J 23/10 422/177 |
| 2007/0269353 A1* | 11/2007 | Li | B01D 53/9418 422/176 |
| 2011/0305614 A1* | 12/2011 | Stiebels | B01D 53/9418 423/213.5 |
| 2015/0005160 A1* | 1/2015 | Nitta | B01J 37/03 502/304 |
| 2015/0080211 A1* | 3/2015 | Miura | B01J 21/066 502/304 |

FOREIGN PATENT DOCUMENTS

| JP | 2005-248726 A | 9/2005 |
|---|---|---|
| JP | 2006-346605 A | 12/2006 |
| JP | 2008-302355 A | 12/2008 |
| JP | 2014-057951 A | 4/2014 |

OTHER PUBLICATIONS

Japanese Office Action (with English translation), Japanese Application No. 2016-068417, dated Jun. 18, 2019 (6 pages).

* cited by examiner

HONEYCOMB STRUCTURE

"The present application is an application based on JP-2016-068417 filed on Mar. 30, 2016 with Japan Patent Office, the entire contents of which are incorporated herein by reference."

BACKGROUND OF THE INVENTION

Field of the Invention

The present invention relates to a honeycomb structure that can be used as an exhaust-gas purifying filter to purify exhaust gas.

Description of the Related Art

A plurality of filters are disposed at an exhaust path of a diesel engine or the like to purify exhaust gas emitted from the engine. Examples of the filters include a diesel particulate filter (DPF) and an SCR (Selective Catalytic Reduction) catalyst (catalyst to reduce a component to be purified through a reduction reaction in a selected manner) converter. The SCR catalyst converter is disposed downstream of the DPF. The DPF is configured to trap a particulate matter (PM) mainly including soot in exhaust gas and prevent emission of the particulate matter into the air. The SCR catalyst converter is configured to reduce $NO_x$ in the exhaust gas using ammonia ($NH_3$). This ammonia is generated through decomposition of urea that is injected from a urea injector disposed upstream of the SCR catalyst converter.

The DPF is typically loaded with a catalyst including noble metal to oxidize carbon monoxide (CO) and hydrocarbon (HC) for removal. That is, in the DPF, soot accumulated at the inside is burned for removal (combustion regeneration treatment). At this time, the catalyst promotes the combustion of soot. The catalyst oxidizes carbon monoxide (CO) and hydrocarbon (HC) for removal that are generated through decomposition of the soot when the soot is burned.

Patent Document 1 is known, for example, as the patent application relating to a urea SCR system. When $NO_x$ is decomposed into $N_2$ and $H_2O$ by the SCR catalyst converter, the ratio of NO and $NO_2$ flowing into the SCR catalyst converter is preferably 1:1 in terms of the reaction speed. In the DPF (Diesel Oxidation Catalyst (DOC)+CSF (Catalyzed Soot Filter)) upstream of the SCR catalyst converter, however, $NO_2$ is consumed for the combustion of PM, so that the ratio of NO is currently considerably more than $NO_2$ when they are emitted from the DPF. This means that the $NO_x$ purifying efficiency is not good.

A technique to bring the ratio of NO and $NO_2$ flowing into the SCR catalyst converter close to 1:1 has been demanded.

In order to bring the ratio of NO and $NO_2$ close to 1:1, a catalyst made of noble metal such as Pt may be disposed at a latter part of the CSF so as to oxidize a part of NO into $NO_2$. Such a catalyst of noble metal often leads to an increase in the cost. Since noble metal has high oxidizing power, it is difficult to control the amount of the noble metal used to convert NO into $NO_2$.

Patent Document 2, which is the patent application relating to an exhaust-gas purifying system as a whole, discloses the configuration including CoO, $MnO_2$, or ZrO as an oxidation catalyst at a former part of the SCR catalyst converter.

Patent Documents 3 and 4 disclose a catalyst loaded honeycomb including an oxidation catalyst. Patent Document 5 discloses an exhaust-gas purifying apparatus including a catalyst to purify nitrogen oxide.

[Patent Document 1] JP-A-2004-100699
[Patent Document 2] JP-A-5-195756
[Patent Document 3] JP-A-2014-57951
[Patent Document 4] JP-A-2008-302355
[Patent Document 5] JP-A-2006-346605

SUMMARY OF THE INVENTION

In Patent Document 2, since CoO is not stable unless the temperature is at 800° C. or more, there is a concern about the stability in exhaust gas at low temperatures. Since $MnO_2$ is decomposed into $Mn_2O_3$ at 550° C. or more, there is a concern about the stability in exhaust gas at high temperatures.

Patent Document 3 aims to promote the combustion action of soot and reduce the amount of soot accumulated at the wall of cells with time. Therefore the catalyst is too fine to function well to promote the reaction of NO and $NO_2$ in the SCR catalyst converter. Such a fine catalyst has a problem in durability because sintering occurs quickly.

Patent Document 4 has a problem in the strength because the porosity is very high to achieve both of lower pressure loss and higher trapping efficiency of PM.

Patent Document 5 is a technique to purify $NO_x$ by reduction, and the loading amount of a catalyst is large.

In order to promote the reaction of NO and $NO_2$ in the SCR catalyst converter, a simple technique at low cost has been demanded to convert a part of the NO into $NO_2$. The present invention aims to provide a honeycomb structure that can be used as an exhaust-gas purifying filter to purify exhaust gas. Especially the present invention provides a honeycomb structure that can be used as a CSF disposed upstream of a SCR catalyst converter, and is configured to convert a part of NO to $NO_2$ appropriately.

To fulfill the above aim, the present invention provides the following honeycomb structure.

According to a first aspect of the present invention, a honeycomb structure is provided, including: a honeycomb structure body including a porous partition wall having a large number of pores, the honeycomb structure body including a plurality of cells defined by the partition wall and serving as a through channel of fluid; and a plugging portion to alternately plug open end parts of the plurality of cells on one side as an inflow side of the exhaust gas and open end parts on the other side as an outflow side of the exhaust gas, wherein the plurality of cells includes inflow cells that are open at the open end parts on the inflow side and outflow cells that are open at the open end parts on the outflow side, the partition wall has porosity of 70% or less, the partition wall is loaded, on the side of the outflow cells, with an oxidation catalyst made of a transition metal oxide to oxidize NO gas or an oxidation catalyst made of a transition metal oxide loaded at $CeO_2$ to oxidize NO gas, the oxidation catalyst has a particle diameter of more than 1 μm and less than 50.0 μm, and the loading amount of the oxidation catalyst is 5.0 g/L or more and 50 g/L or less.

According to a second aspect of the present invention, the honeycomb structure according to the first aspect is provided, wherein the honeycomb structure has a $NO_2$ conversion rate at 250° C. that is more than 3.0% and less than 35%.

According to a third aspect of the present invention, the honeycomb structure according to the first or second aspects is provided, wherein the transition metal oxide includes any one of $Fe_2O_3$, $MnO_2$, and $Co_3O_4$.

According to a fourth aspect of the present invention, the honeycomb structure according to the first or second aspects is provided, wherein the oxidation catalyst made of the transition metal oxide loaded at $CeO_2$ includes any one of $Fe_2O_3/CeO_2$, $MnO_2/CeO_2$, and $Co_3O_4/CeO_2$.

According to a fifth aspect of the present invention, the honeycomb structure according to any one of the first to fourth aspects is provided, wherein 60% or more of the transition metal oxide is loaded at the partition wall from a ½ position in the thickness direction toward the side of the outflow cells.

The honeycomb structure of the present invention includes a plugging portion to alternately plug open end parts of the plurality of cells on one side as an inflow side of the exhaust gas and open end parts on the other side as an outflow side of the exhaust gas. The honeycomb structure includes inflow cells into which exhaust gas flows and outflow cells from which the exhaust gas passed through the partition wall flows out. The partition wall is loaded, on the side of the outflow cells, with an oxidation catalyst made of a transition metal oxide to oxidize NO gas or an oxidation catalyst made of a transition metal oxide loaded at $CeO_2$ to oxidize NO gas. The partition wall has porosity of 70% or less, the oxidation catalyst has a particle diameter of more than 1 μm and less than 50.0 μm, and the loading amount of the oxidation catalyst is 5.0 g/L or more and 50 g/L or less. Thereby, a good balance between NO and $NO_2$ flowing into the SCR catalyst converter disposed downstream can be obtained, and the reactions of NO, $NO_2$, and $NH_3$ occur efficiently. That is, the purifying efficiency of exhaust gas can increase.

DETAILED DESCRIPTION OF THE PRESENT INVENTION

The following describes embodiments of the present invention, with reference to the drawings. The present invention is not limited to the following embodiments, and is susceptible to various changes, modifications and improvements without deviating from the scope of the invention.

Figure 1:
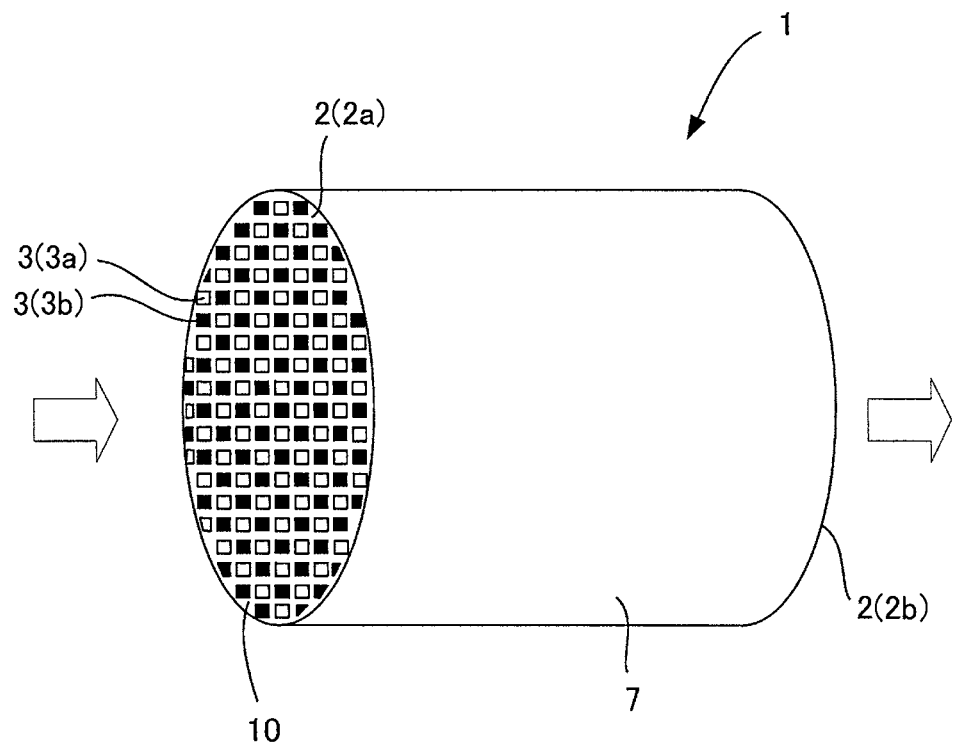
FIG. 1 is a perspective view schematically showing a honeycomb structure.
Figure 2:
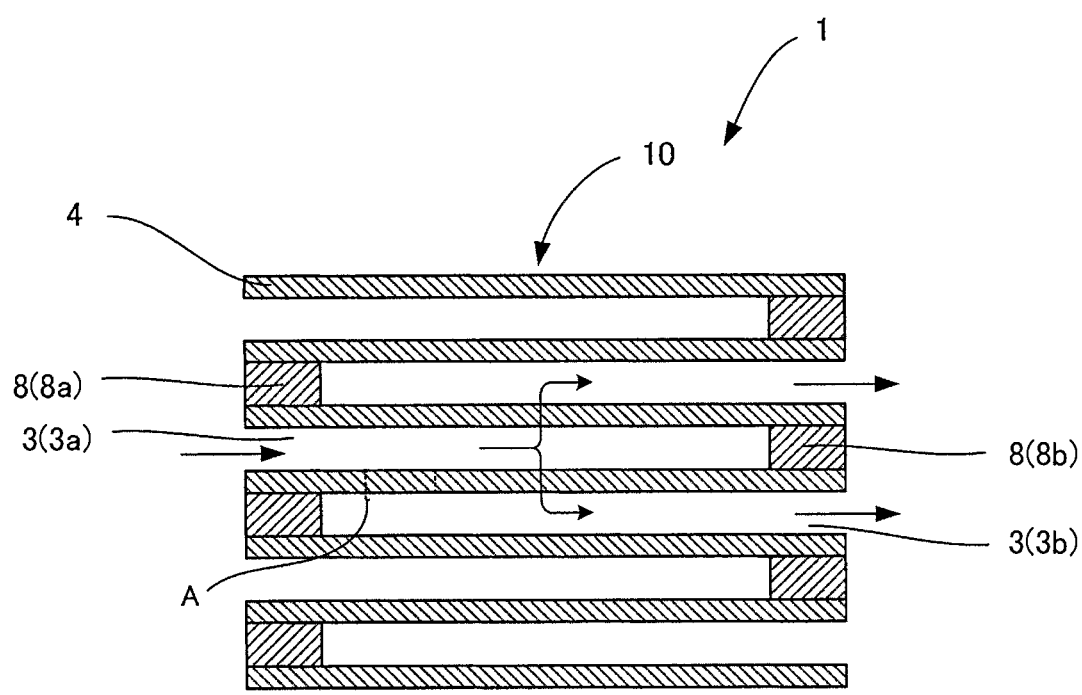
FIG. 2 is a schematic view of a cross section of the honeycomb structure that is parallel to the extending direction of cells.

(1) Honeycomb Structure:

FIGS. 1 and 2 show one embodiment of a honeycomb structure of the present invention. FIG. 1 is a perspective view schematically showing a honeycomb structure 1. FIG. 2 is a schematic view of a cross section of the honeycomb structure 1 that is parallel to the extending direction of cells 3. The honeycomb structure 1 includes a honeycomb structure body 10 having a porous partition wall 4 with a large number of pores, in which a plurality of cells 3 serving as a through channel of exhaust gas are defined by the partition wall 4, and a plugging portion 8 to alternately plug open end parts of the plurality of cells 3 on one side as an inflow side of the exhaust gas and open end parts on the other side as an outflow side of the exhaust gas. The plurality of cells 3 includes inflow cells 3a that are open at the open end parts on the inflow side and outflow cells 3b that are open at the open end parts on the outflow side. The plugging portion 8 includes an inflow side plugging portion 8a disposed at the inflow end face 2a of a predetermined cells 3 and an outflow side plugging portion 8b disposed at the outflow end face 2b of the residual cells 3.

Figure 3A:
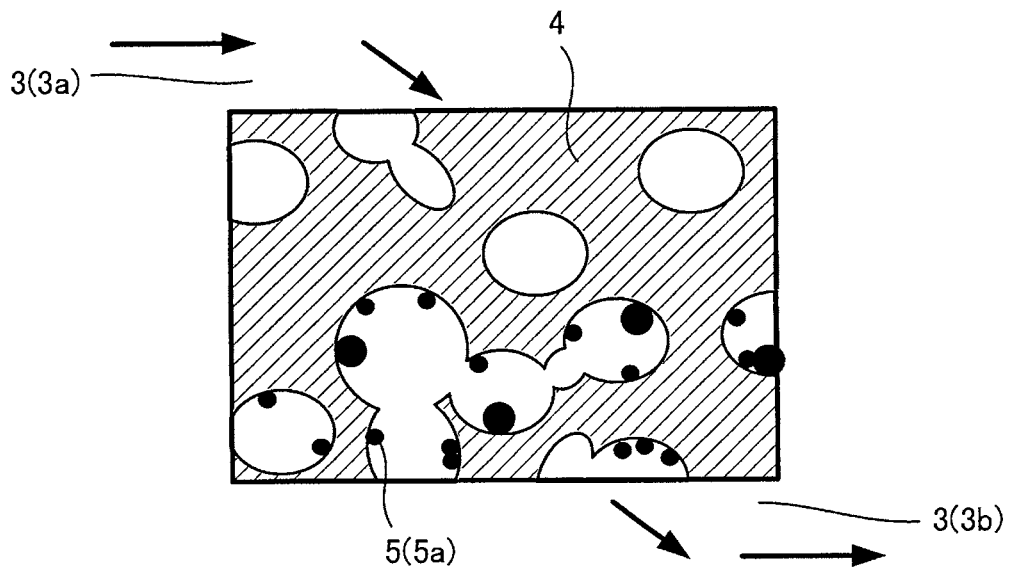
FIG. 3A is an enlarged cross-sectional view schematically showing a part of a cross section of the honeycomb structure that is parallel to the extending direction of cells.
Figure 3B:
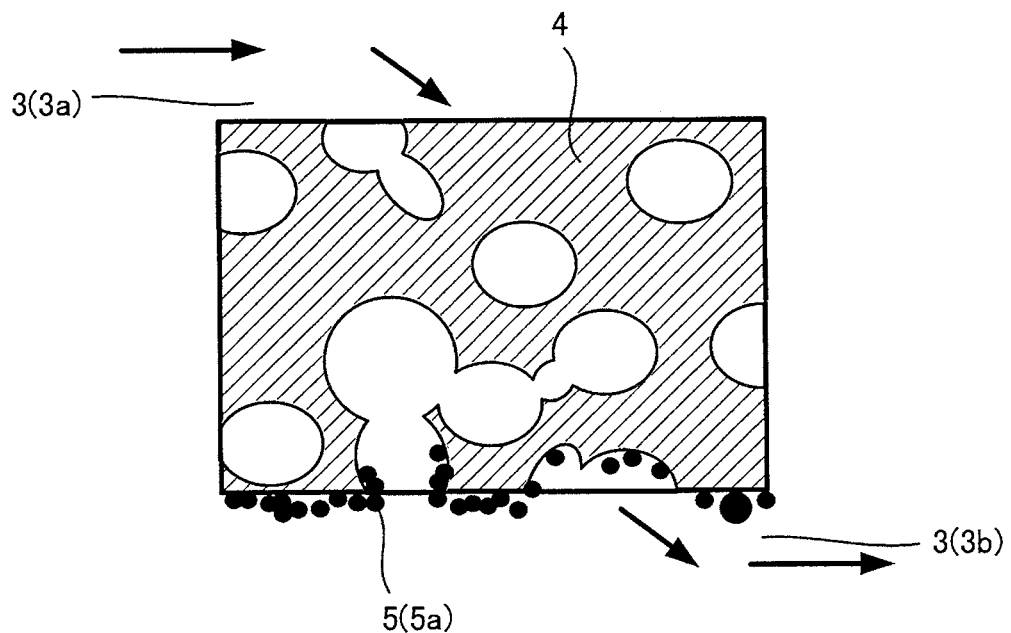
FIG. 3B is an enlarged cross-sectional view schematically showing a part of a cross section of the honeycomb structure that is parallel to the extending direction of cells.

FIGS. 3A and 3B are enlarged views of region A in FIG. 2. The partition wall has porosity of 70% or less, and as shown in FIGS. 3A and 3B, the partition wall 4 is loaded, on the side of the outflow cells 3b, with an oxidation catalyst 5 made of a transition metal oxide 5a to oxidize NO gas or an oxidation catalyst 5 made of a transition metal oxide 5a loaded at $CeO_2$ to oxidize NO gas. The oxidation catalyst 5 has a particle diameter of more than 1 μm and less than 50.0 μm. The loading amount of the oxidation catalyst 5 is 5.0 g/L or more and 50 g/L or less. The honeycomb structure 1 can be used as an exhaust-gas purifying filter. NO included in exhaust gas flowing into the honeycomb structure 1 is oxidized to $NO_2$. The honeycomb structure 1 preferably has a $NO_2$ conversion rate at 250° C. that is more than 3.0% and less than 35%. The $NO_2$ conversion rate is the ratio of NO that is converted into $NO_2$. When the $NO_2$ conversion rate is within this range, exhaust gas flowing into a downstream SCR catalyst converter 70 (see FIG. 5) can be purified efficiently.

The transition metal oxide 5a loaded at the partition wall 4 is preferably any one of $Fe_2O_3$, $MnO_2$, and $Co_3O_4$. These transition metal oxides 5a enable appropriate oxidization of NO into $NO_2$. Therefore the loading amount of catalyst can be adjusted easily. Especially $Fe_2O_3$ and $Co_3O_4$ are stable substances at 200 to 800° C., and there is no concern about the stability.

Figure 4:
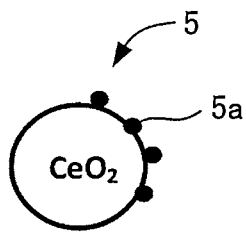
FIG. 4 schematically shows transition metal oxide loaded at $CeO_2$.

The oxidation catalyst 5 made of the transition metal oxide 5a loaded at $CeO_2$ is preferably any one of $Fe_2O_3/CeO_2$, $MnO_2/CeO_2$, and $Co_3O_4/CeO_2$. As shown in FIG. 4, $Fe_2O_3/CeO_2$ is an oxidation catalyst 5 in which $CeO_2$ is loaded with $Fe_2O_3$. Similarly, $MnO_2/CeO_2$ and $Co_3O_4/CeO_2$ also are catalysts in which $CeO_2$ is loaded with $MnO_2$ and $Co_3O_4$, respectively.

The oxidation catalyst has a particle diameter of more than 1 μm and less than 50.0 μm, preferably more than 2 μm and less than 30.0 μm, and more preferably more than 3 μm and less than 15.0 μm. In the present description, a particle diameter is obtained as follows. Firstly, an image (image of a raw material) in a visual field with 1000 magnification is observed with a SEM. Three of the visual fields are observed. In each visual field, all particulates included in the visual field are targets of the observation. Then, for all of the particulates in the three visual fields, the average of the three visual fields as a whole is found, and this value is set as the particle diameter.

The loading amount of the oxidation catalyst is 5.0 g/L or more and 50 g/L or less, preferably 5.0 g/L or more and 45 g/L or less, and more preferably 5.0 g/L or more and 40 g/L or less. The loading amount the catalyst (g/L) in the present description is the amount (g) of the catalyst that is loaded per unit volume (L) of the honeycomb structure.

Preferably, 60% or more of the transition metal oxide 5a is loaded at the partition wall 4 from a ½ position in the thickness direction toward the side of the outflow cells 3b. FIG. 3A schematically shows that 60% or more of transition metal is loaded at the partition wall 4 from a ½ position in the thickness direction toward the side of the outflow cells 3b. FIG. 3B schematically shows that transition metal is loaded on the surface and the surrounding of the partition wall 4 on the side of the outflow cell 3b. In the present description, the loading amount of the transition metal oxide 5a is measured as follows. Firstly a porous material of the present invention surrounded with resin is mirror-polished using diamond slurry or the like, which is a sample to be observed. This cross-sectional polished face is observed with 100 magnification to obtain a photo of a microstructure. In this photo, the number of all catalyst particulates is measured, and this is the number of all catalyst particulates $N_a$. Next, the number of the catalyst particulates from a half of the partition wall to the outlet is measured, and this is the number of catalyst $N_h$ occupying ½ of the thickness of the partition wall. The ratio of the catalyst occupying ½ of the thickness of the partition wall 4 is calculated by $N_h/N_a$ from these measurements.

When exhaust gas passes through the partition wall 4 of such a honeycomb structure 1, a part of NO is oxidized by the transition metal oxide 5a and is changed into $NO_2$. Thereby, a good balance between NO and $NO_2$ can be obtained, which flow into a downstream SCR catalyst converter 70. This can promote a chemical reaction to purify the exhaust gas and so the exhaust gas can be purified efficiently.

A part of the partition wall 4 close to the inflow cell 3a in the thickness direction is preferably loaded with a catalyst to promote the combustion of soot. As such a catalyst to promote the combustion of soot, a catalyst including noble metal at the ratio of about 5 to 30 g/L preferably is loaded. In the present specification, the description that a catalyst is loaded at a part close to the inflow cell 3a refers to that the amount of the catalyst including noble metal loaded from the surface of the partition wall 4 on the side of the inflow cell to ½ of the thickness accounts for 60% or more of the entire amount.

Exhaust gas passing through the honeycomb structure 1 of the present invention is fed to the SCR catalyst converter 70 disposed downstream of the honeycomb structure 1. In this SCR catalyst converter 70, $NO_x$ in the exhaust gas can be favorably purified using NO, $NO_2$, and ammonia. That is, the SCR catalyst converter 70 is configured to purify $NO_x$ in the exhaust gas with urea-derived ammonia supplied by a urea injector 60.

(1-1) Honeycomb Structure Body:

The partition wall 4 preferably has a thickness of 50 to 500 μm, more preferably 100 to 450 μm, and particularly preferably 150 to 450 μm. If the thickness of the partition wall 4 is the lower limit or more, the strength of the honeycomb structure body is enough. If the thickness is the upper limit or less, the pressure loss can be suppressed.

The partition wall 4 preferably has porosity of 25 to 70%, more preferably 30 to 70%, and particularly preferably 34 to 68%. If the porosity is the lower limit or more, an increase in pressure loss can be suppressed. If the porosity is the upper limit or less, the honeycomb structure body can have enough strength. In order to obtain porosity of the partition wall 4, a SEM image of a cross section of the partition wall 4 is taken with 1000 magnification or more. Binarization is then performed for the taken SEM image based on a difference in brightness between a solid part and a void part. Next, the ratio of area between the void part and the solid part is obtained at visual fields of 20 or more, and the average of the ratio of area is calculated. This is the porosity of the partition wall.

The average pore diameter of the partition wall 4 preferably is 5 to 40 μm, more preferably 8 to 30 μm, and particularly preferably 9 to 25 μm. If the average pore diameter of the partition wall 4 is the lower limit or more, an increase in pressure loss can be suppressed. If the average pore diameter is the upper limit or less, the trapping efficiency of soot increases. The average pore diameter is calculated as follows. Firstly a SEM image of a cross section of the partition wall 4 is taken with 1000 magnification or more. Binarization is then performed for the taken SEM image based on a difference in brightness between a solid part and a void part. Next, a circle inscribed in the outline of a solid part in a void part is drawn at 20 positions or more, and the average of the diameters of these inscribed circles is calculated. This is the average pore diameter.

The honeycomb structure body 10 preferably has a cell density of 8 to 95 cells/cm$^2$, and 15 to 78 cells/cm$^2$ more preferably. If the cell density is the lower limit or more, the filtering area is enough and so the trapping efficiency of soot can increase. If the cell density is the upper limit or less, the pressure loss in the honeycomb structure body without soot accumulated (initial pressure loss) can be suppressed.

A preferable example of the material of the honeycomb structure body 10 includes ceramic. From the viewpoints of the strength, heat resistance and corrosion resistance, for example, the honeycomb structure body is preferably made of any one of cordierite, silicon carbide, alumina, mullite, aluminum titanate, silicon nitride and a silicon-silicon carbide based composite material including silicon carbide as aggregate and metal silicon as a raw material of a binding part. Among them, cordierite is particularly preferable.

(1-2) Plugging Portion:

The honeycomb structure 1 includes an inflow side plugging portion 8a and an outflow side plugging portion 8b. The honeycomb structure having these plugging portions 8 enables the favorable trapping of particulate matter in exhaust gas. In the honeycomb structure body 10 of the honeycomb structure 1, cells 3 having the outflow side plugging portion 8b are inflow cells 3a, and the cells 3 having the inflow side plugging portion 8a are outflow cells 3b.

The honeycomb structure 1 may have a length in the extending direction of the cells 3 that is 30 to 500 mm.

The honeycomb structure of the present invention may further include a circumferential wall 7 (see FIG. 1) on the lateral face of the honeycomb structure body 10.

The honeycomb structure body 10 may be a bonded member including a plurality of honeycomb segments. That is, the honeycomb structure body 10 may include a collective body of these plurality of honeycomb segments and a bonding part made of a bonding material to bond these honeycomb segments.

The honeycomb structure 1 may have a configuration in which the inflow cells 3a and the outflow cells 3b have different shapes in a cross section perpendicular to the extending direction of the cells 3 (HAC configuration: High Ash Capacity configuration). For instance, they may be the combination of octagons and quadrangles in a cross section, including inflow cells 3a having a larger cell cross-sectional area and outflow cells 3b having a smaller cell cross-sectional area. This can increase the surface area of the surface of the inflow cells 3a in which particulate matter or the like accumulates, and so an increase in pressure loss can be suppressed.

(2) Method for Manufacturing Honeycomb Structure:

The following describes a method for manufacturing the honeycomb structure 1 of the present embodiment. Firstly a kneaded material is prepared to produce the honeycomb structure 1. This kneaded material is formed to have a honeycomb formed body (forming step). Thereafter plugging is performed at open ends of predetermined cells 3 at the inflow end face and at open ends of the residual cells 3 at the outflow end face to form an inflow side plugging portion and an outflow side plugging portion (plugging step). Thereafter, the honeycomb formed body having the plugging portions 8 formed alternately is fired to have a honeycomb fired body (firing step). In this way, the honeycomb structure 1 can be manufactured.

A catalyst may be loaded before forming the plugging portion 8 or may be loaded after forming the plugging portion 8. The following describes each manufacturing step in details.

(2-1) Forming Step:

In the forming step, a kneaded material including a ceramic forming raw material containing a ceramic raw material is prepared. This kneaded material is formed to have a honeycomb formed body in which a plurality of cells 3 are defined. The plurality of cells serves as a through channel of fluid.

This ceramic forming raw material is preferably prepared by mixing the ceramic raw material as stated above with dispersing medium, organic binder, inorganic binder, pore former, surfactant and the like. The composition ratio of these raw materials is not limited especially, and a composition ratio suitable for the structure of the honeycomb structure 1 to be manufactured, its materials and the like is preferable.

A method for preparing a kneaded material is not limited especially. For instance, a kneader or a vacuum pugmill may be used for this purpose. As a method for forming the kneaded material, a conventionally known forming method can be used, such as extrusion and injection molding. A preferable example of the method for this includes a method for forming a honeycomb formed body by extrusion using a die having a desired cell shape, partition wall thickness and cell density.

Examples of the shape of the honeycomb formed body include a pillar shape having a cross section orthogonal to the center axis that is of a circle shape, an ellipse shape, a race-track shape, a triangle shape, a quadrangle shape, a pentagon shape, a hexagon shape and an octagon shape.

The obtained honeycomb formed body may be dried. Examples of the method for drying include hot air drying, microwave drying, dielectric drying, reduced-pressure drying, vacuum drying, and freeze-drying. Among them, dielectric drying, microwave drying or hot air drying is preferably performed alone or in combination.

(2-2) Firing Step:

Before firing (main firing) the honeycomb formed body, it is preferable that the honeycomb formed body be calcinated. Calcination is for degreasing. The method therefor is not limited especially as long as it can remove internal organic substance (organic binder, dispersing agent, pore former and the like). In general the combustion temperature of organic binder is about 100 to 300° C., and the combustion temperature of pore former is 200 to 800° C. Therefore, the calcination is preferably performed under the conditions at about 200 to 1000° C. for about 3 to 100 hours in the air.

Suitable conditions may be selected for firing (main firing) of the honeycomb formed body. For instance, a preferable firing temperature is from 1410 to 1440° C. The firing time is preferably 4 to 7 hours, which is a time to keep the highest temperature.

(2-3) Plugging Step:

The plugging portion 8 may be formed by disposing a mask at open ends on one side of predetermined cells 3 and filling open ends of the residual cells 3 with plugging slurry. Such a method for forming the plugging portion 8 can follow a conventionally-known method for manufacturing a plugging portion 8 of a honeycomb structure.

A raw material of the plugging portion 8 may be a raw material similar to that of the honeycomb structure body 10. This allows the expansion rate during the firing of the honeycomb formed body and the plugging portion 8 to be the same. Therefore durability of the honeycomb structure 1 can increase.

(2-4) Loading with Catalyst

The oxidation catalyst 5 may be loaded on the side of the outflow cells 3b of the partition wall 4 of the honeycomb structure 1 by immersing the honeycomb structure 1 having the plugging portion 8 into the container storing slurry of the oxidation catalyst 5 from the outflow end face 2b. Then, the slurry is sucked from the side of the inflow cells 3a. When the honeycomb structure still does not have the plugging portion 8, similar procedure may be performed after attaching a mask having holes at positions corresponding to the predetermined cells 3 to the end face of the honeycomb structure 1.

The viscosity of the slurry of the oxidation catalyst 5, the particle diameter of the oxidation catalyst 5 included and the suction power to suck the slurry may be adjusted, so that catalyst can be loaded not only at the surface of the partition wall 4 but also at the inside of pores of the partition wall 4. The amount of the catalyst loaded also can be adjusted. Suction of the slurry may be performed a plurality of times, whereby the amount of the catalyst loaded can be adjusted.

Figure 5:
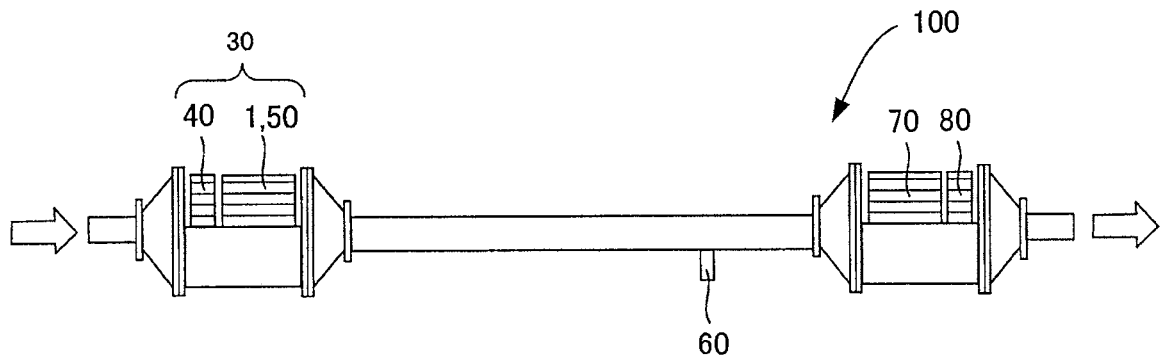
FIG. 5 schematically shows an exhaust-gas purifying system.

(3) Exhaust-Gas Purifying System:

FIG. 5 shows an exhaust-gas purifying system 100 including a DPF 30 and a SCR catalyst converter 70. The DPF 30 further includes a DOC 40 (upstream-side oxidation catalyst) and a CSF 50. The honeycomb structure 1 of the present invention can be used as the CSF 50. The exhaust-gas purifying system 100 includes a urea injector 60 between the DPF 30 and the SCR catalyst converter 70.

The SCR catalyst converter 70 is disposed downstream of the CSF 50 (honeycomb structure 1), and is a filter loaded with SCR catalyst. The DOC 40 (upstream-side oxidation catalyst) is disposed upstream of the CSF 50 (honeycomb structure 1), and is a filter loaded with oxidation catalyst. The urea injector 60 enables injection of urea, and is disposed between the honeycomb structure 1 and the SCR catalyst converter 70.

The exhaust-gas purifying system 100 is to purify exhaust gas emitted from an engine. Exhaust gas emitted from the engine passes through the DPF 30 (DOC 40, CSF 50), and then flows into the SCR catalyst converter 70 together with urea for purification. The exhaust-gas purifying system 100 may include a downstream-side oxidation catalyst 80 downstream of the SCR catalyst converter 70, and the downstream-side oxidation catalyst 80 is to oxidize ammonia. Reactions in them are described as follows, referring to FIG. 6.

Figure 6:
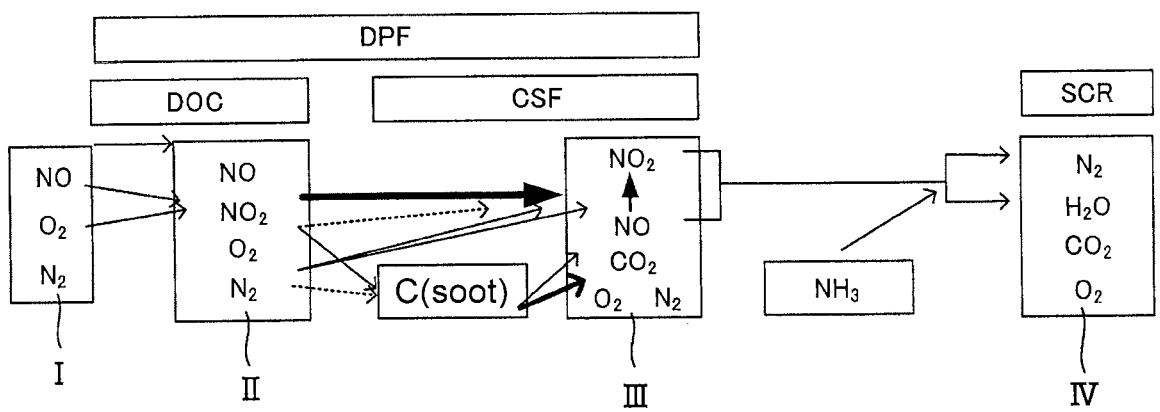
FIG. 6 describes reactions in the exhaust-gas purifying system.

When NO, $O_2$, and $N_2$ (I in FIG. 6) flow into the DOC 40, the following reactions occur at the DOC 40, and $NO_2$ is generated (II in FIG. 6).

$$2NO + O_2 = 2NO_2 \qquad \text{(Formula 1)}$$

$$SOF + O_2 = CO, CO_2, H_2O \qquad \text{(Formula 2)}$$

SOF (Soluble Organic Fraction) is included in PM (particulate matter).

The DOC 40 (upstream-side oxidation catalyst) oxidizes NO and purifies SOF. As the DOC 40, a well-known catalyst may be used as needed. Specifically the upstream-side oxidation catalyst includes a pillar-shaped honeycomb structure having a partition wall that defines a plurality of cells serving as a through channel of fluid, and oxidation catalyst loaded at the surface of the partition wall of this honeycomb structure.

In the CSF 50 (honeycomb structure 1), the following reactions occur, so that NO is generated from $NO_2$ (III in FIG. 6)

$$C\text{ (soot)} + 2NO_2 = CO_2 + 2NO \quad \text{(Formula 3)}$$

$$C\text{ (soot)} + NO_2 = CO + NO \quad \text{(Formula 4)}$$

$$C\text{ (soot)} + \tfrac{1}{2}O_2 + NO_2 = CO_2 + NO \quad \text{(Formula 5)}$$

The urea injector 60 is to inject urea upstream of the SCR catalyst converter 70 so as to supply ammonia decomposed and generated from the urea to the SCR catalyst converter 70. As the urea injector 60, a conventionally known urea injector can be used, which can inject a predetermined amount of urea.

Gas emitted from the CSF 50 and urea injected from the urea injector 60 flow into the SCR catalyst converter 70. Then the following reactions occur in the SCR catalyst converter 70, and the exhaust gas is purified (IV in FIG. 6).

$$4NO + 4NH_3 + O_2 = 4N_2 + 6H_2O \quad \text{(Formula 6)}$$

$$NO + NO_2 + 2NH_3 = 2N_2 + 3H_2O \quad \text{(Formula 7)}$$

$$6NO_2 + 8NH_3 = 7N_2 + 12H_2O \quad \text{(Formula 8)}$$

The SCR catalyst converter 70 is to purify $NO_x$ with ammonia that is generated through decomposition of urea injected from the urea injector 60. As the SCR catalyst converter 70, a well-known one may be used. Specifically the SCR catalyst converter 70 includes a pillar-shaped honeycomb structure having a partition wall that defines a plurality of cells serving as a through channel of fluid, and SCR catalyst loaded at the surface of the partition wall of this honeycomb structure.

As shown in Formula 7, NO and $NO_2$ react at 1:1, so that $N_2$ and $H_2O$ are generated. NO and $NO_2$ flowing into the SCR catalyst converter 70 are 1:1, which is necessary for efficient reactions in the SCR catalyst converter 70.

The honeycomb structure used for the CSF 50 of the present invention includes the oxidation catalyst 5 made of transition metal oxide 5a to oxidize NO gas or the oxidation catalyst 5 made of transition metal oxide 5a loaded at $CeO_2$ to oxidize NO gas, and these catalyst are loaded on the side of the outflow cells 3b of the partition wall 4. This can convert a part of NO emitted from the CSF 50 into $NO_2$ (III in FIG. 6, NO→$NO_2$). Thereby, a good balance between NO and $NO_2$ flowing into the SCR catalyst converter 70 can be obtained, and the reactions of NO, $NO_2$, and $NH_3$ occur efficiently.

The exhaust-gas purifying system 100 of FIG. 5 further includes the downstream-side oxidation catalyst 80. The downstream-side oxidation catalyst 80 is disposed downstream of the SCR catalyst converter 70, and is a honeycomb structure loaded with oxidation catalyst. There is a fear that ammonia may be emitted from the SCR catalyst converter 70 to the air. Such a downstream-side oxidation catalyst 80, however, can oxidize and remove ammonia emitted from the SCR catalyst converter 70.

The downstream-side oxidation catalyst 80 used may be the same as the upstream-side oxidation catalyst as stated above. Specifically the downstream-side oxidation catalyst 80 includes a pillar-shaped honeycomb structure having a partition wall that defines a plurality of cells serving as a through channel of fluid, and oxidation catalyst loaded at the surface of the partition wall of this honeycomb structure.

With this configuration, the exhaust-gas purifying system 100 including the honeycomb structure 1 of the present invention enables efficient reactions of NO, $NO_2$, and $NH_3$ and so the purifying efficiency of exhaust gas increases.

EXAMPLES

The following describes the present invention by way of examples in more details. The present invention is not limited to these examples.

Example 1

Pore former, organic binder and water were added to a cordierite forming raw material including talc, kaolin, and alumina to prepare a forming raw material. As the pore former, hollow resin particulates having the average particle diameter of 20 μm were used. This average particle diameter was a value measured by a laser diffraction method. Methylcellulose and hydroxypropoxyl methylcellulose were used as the organic binder. The amount of these raw materials added was 15 parts by mass of the pore former, 4 parts by mass of the organic binder and 27 parts by mass of water with reference to 100 parts by mass of the cordierite forming raw material.

Next, the forming raw material was kneaded to have a round pillar-shaped kneaded material. Next, the obtained round-pillar shaped kneaded material was formed using a vacuum extruder to be a honeycomb shape, and a honeycomb formed body was formed in this way. The obtained honeycomb formed body was dried by a microwave dryer, and then was dried by a hot-air dryer, and a honeycomb dried body was obtained in this way.

Next, a plugging portion 8 was formed at open end parts of the cells 3 of this honeycomb dried body on one side. The plugging portion 8 was formed so that a checkerboard pattern appeared at each of the end faces of the honeycomb dried body (inflow end face and outflow end face) with the cells 3 having the plugging portion 8 at the open end parts and the cells 3 not having the plugging portion 8 at the open end parts. The plugging portion 8 was formed firstly by attaching a sheet to the end face of the honeycomb dried body and boring holes at positions of the sheet corresponding to the cells 3 to which the plugging portion 8 was to be formed. Next, while leaving this sheet attached there, the end face of the honeycomb dried body was immersed in slurry for plugging to fill the open ends of the cells 3 to which the plugging portion was to be formed with the slurry for plugging via the holes of the sheet. The slurry for plugging was a material of the plugging portion 8 in a slurry form. The material of the plugging portion 8 used was the same as the forming raw material as stated above.

The slurry for plugging filled in the open end parts of the cells 3 in this way was dried. After that, this honeycomb dried body was calcinated (degreased) at 550° C. for 3 hours in the air. After that, this was fired at about 1400 to 1500° C. for 7 hours, so that a honeycomb structure was obtained.

This honeycomb structure had a cylindrical shape of 144 mm in diameter and 152 mm in length. The cell shape was square, the cell density was 47 cells/cm², the thickness (T) of the partition wall as a whole was 300 μm, the porosity of the partition wall as a whole was 41.0%, and the average pore diameter of the partition wall as a whole was 20 μm.

Subsequently, oxidation catalyst 5 made of transition metal oxide 5a ($Fe_2O_3$ loaded at the carrier of $CeO_2$) was loaded at the surface of the partition wall of this honeycomb structure on the outflow side. Specifically for this loading, firstly catalyst slurry was prepared, including the oxidation catalyst 5 made of the transition metal oxide 5a. Water was used as the dispersing agent of the catalyst slurry. The amount of water was adjusted so that the slurry had viscosity of 7 mPa·s. This catalyst slurry was introduced into the outflow cells 3b of the honeycomb structure 1, and was sucked from the side of the inflow end face of the honeycomb structure 1 so as to coat the partition wall 4 on the side of the outflow cells 3b with the catalyst slurry. Subsequently, this honeycomb structure 1 was dried by a hot air dryer, so that a honeycomb structure 1 of Example 1 including the oxidation catalyst 5 made of the transition metal oxide 5a loaded was obtained.

Examples 2 to 10, Comparative Examples 1 to 3

Similarly to Example 1, honeycomb structures 1 loaded with the oxidation catalyst 5 made of transition metal oxide 5a of Examples 2 to 10 and Comparative Examples 1 to 3 were obtained. Table 1 shows the details. In Comparative Example 3, Pt was used instead of the oxidation catalyst 5.

(1) Open Porosity and Average Pore Diameter of Base Material

In the present description, open porosity was a value obtained by calculation using the total pore volume (unit: cm³/g) in accordance with mercury intrusion porosimetry (complying with JIS R 1655) and apparent density (unit: g/cm³) measured by the Archimedes's method. The open porosity was calculated using the expression of "porosity [%]=total pore volume/{(1/apparent density)+total pore volume}×100". The average pore diameter was a value measured by mercury intrusion porosimetry (complying with JIS R 1655).

(2) Crystalline Phase of Catalyst

Crystalline phase was identified as follows. An X-ray diffraction pattern was obtained using an X-ray diffractometer. A rotating anticathode X-ray diffractometer (RINT, manufactured by Rigaku Corporation) was used as the X-ray diffractometer. X-ray diffraction was measured using CuKα-ray source and at 50 kV, 300 mA and 2θ=10 to 60°. The X-ray diffraction data was analyzed using "X-ray data analysis software JADE7" manufactured by MDI to identify the crystalline phase.

(3) Particle Diameter of Catalyst

Particle diameter of the catalyst was measured as follows. A porous material of the present invention surrounded with resin was mirror-polished using diamond slurry or the like, which was a sample to be observed. This cross-sectional polished face was observed with 1000 magnification to obtain a photo of a microstructure. In this photo, all catalyst particulates were measured. This measurement was performed for 3 visual fields, and their average was calculated. This average was the particle diameter of the catalyst.

(4) $NO_2$ Conversion Rate

The honeycomb structures manufactured as stated above (Examples 1 to 10 and Comparative Examples 1 to 3) were processed, and test pieces of 25.4 mm in diameter and 50.8 mm in length were obtained. The processed circumference was coated with the same material as the base material. They were used as measurement samples for the evaluation using an analyzer of exhaust gas from automobile. At this time, the measurement sample was set in a reaction tube in a heating furnace so that the temperature was held at 250° C. Meanwhile mixture gas was prepared so that the gas temperature was adjusted at 250° C., having a nitrogen balance of NO (nitrogen monoxide): 200 ppm and $O_2$ (oxygen): 10%. This mixture gas was introduced into the measurement sample set in the reaction tube. Gas emitted from the measurement sample (exhaust gas) was analyzed using an exhaust-gas measurement apparatus (manufactured by HORIBA, Ltd., MEXA-6000FT), to measure the exhaust concentration (NO concentration and $NO_2$ concentration). Based on the measurement result, $NO_2$ conversion rate (1−(NO concentration/(NO concentration+$NO_2$ concentration))) was calculated.

(5) Ratio of Catalyst Occupying ½ of the Thickness of the Partition Wall

Ratio of catalyst occupying ½ of the thickness of the partition wall was measured as follows. A porous material of the present invention surrounded with resin was mirror-polished using diamond slurry or the like, which was a sample to be observed. This cross-sectional polished face was observed with 100 magnification to obtain a photo of a microstructure. In this photo, the number of all catalyst particulates was measured, and this was the number of all catalyst particulates $N_a$. Next, the number of the catalyst particulates from a half of the partition wall to the outlet side was measured, and this was the number of catalyst $N_h$ occupying ½ of the thickness of the partition wall. The ratio of the catalyst occupying ½ of the thickness of the partition wall was calculated by $N_h/N_a$ from these measurements.

TABLE 1

| Type of base material | Porosity of base material % | Average pore diameter of base material μm | Crystalline phase of catalyst active species | Crystalline phase of catalyst carrier | Catalyst synthesis temperature ° C. | Loading amount of catalyst at base material g/L | Catalyst particle diameter μm | Specific surface area of catalyst m²/g | Loading amount of active species mass % | Crystallite diameter of active species nm | NO$_2$ conversion rate (250° C.) % | Ratio of catalyst occupying ½ of partition wall thickness % |
|---|---|---|---|---|---|---|---|---|---|---|---|---|
| Ex. 1 | Si bonded SiC | 41.0 | 11.0 | Fe$_2$O$_3$ | CeO$_2$ | 300 | 20 | 4.8 | 112.5 | 5 | 13.5 | 3.5 | |
| Ex. 2 | | | | | | 300 | 20 | 4.5 | 100.0 | 20 | 13.0 | 4.0 | |
| Ex. 3 | | | | | | 300 | 20 | 5.2 | 97.3 | 40 | 20.0 | 4.3 | |
| Ex. 4 | | | | Co$_3$O$_4$ | CeO$_2$ | 300 | 10 | 5.0 | 84.2 | 20 | 13.9 | 6.3 | |
| Ex. 5 | | | | | | 300 | 20 | 5.0 | 84.2 | 20 | 13.9 | 15.8 | |
| Ex. 6 | | | | | | 500 | 20 | 5.1 | 78.0 | 20 | 19.9 | 13.4 | |
| Ex. 7 | | | | | | 300 | 10 | 5.0 | 84.2 | 20 | 13.9 | 7.5 | 69.8 |

TABLE 1-continued

| Type of base material | Porosity of base material % | Average pore diameter of base material μm | Crystalline phase of catalyst active species | Crystalline phase of catalyst carrier | Catalyst synthesis temperature °C | Loading amount of catalyst at base material g/L | Catalyst particle diameter μm | Specific surface area of catalyst m²/g | Loading amount of active species mass % | Crystallite diameter of active species nm | $NO_2$ conversion rate (250° C.) % | Ratio of catalyst occupying ½ of partition wall thickness % |
|---|---|---|---|---|---|---|---|---|---|---|---|---|
| Ex. 8 | | | | | | 20 | | | | | 14.1 | 67.0 |
| Ex. 9 | | | $MnO_2$ | $CeO_2$ | 300 | 20 | 4.6 | 100.0 | 20 | 30.0 | 8.0 | |
| Ex. 10 | | | $Mn_2O_3$ | $CeO_2$ | 550 | 20 | 5.0 | 98.0 | 20 | 35.0 | 12.0 | |
| Comp. Ex. 1 | Si bonded SiC | 41.0 | 11.0 | $Co_3O_4$ | $SiO_2$ | 300 | 20 | 50.0 | 451.5 | 20 | 15.0 | under measurement limit |
| Comp. Ex. 2 | Si bonded SiC | 41.0 | 11.0 | $Co_3O_4$ | $Al_2O_3$ | 300 | 20 | <0.05 | 142.3 | 20 | 18.0 | under measurement limit |
| Comp. Ex. 3 | Si bonded SiC | 41.0 | 11.0 | Pt | $Al_2O_3$ | 550 | 20 | <0.05 | 159.6 | 10 | 10.0 | 40.8 |

In Comparative Example 1 having the particle diameter of the catalyst of 50.0 μm and Comparative Example 2 having the particle diameter less than 0.05 μm, their $NO_2$ conversion rates were under the measurement limit. Since Comparative Example 3 included Pt as the catalyst, the $NO_2$ conversion rate was too large.

In Examples 1 to 10, their $NO_2$ conversion rates were within the appropriate range (more than 3.0% and less than 35%).

The honeycomb structure of the present invention can be used as an exhaust-gas purifying filter to purify exhaust gas emitted from an internal combustion engine such as a diesel engine or various types of combustion apparatuses. Especially the honeycomb structure of the present invention can be used as a particulate trapping filter to trap PM in the exhaust gas. Specifically the honeycomb structure of the present invention can be used as a CSF disposed upstream of a SCR catalyst converter.

DESCRIPTION OF REFERENCE NUMERALS

1: honeycomb structure, 2: end face, 2a: inflow side end face, 2b: outflow end face, 3: cell, 3a: inflow cell, 3b: outflow cell, 4: partition wall, 5: oxidation catalyst, 5a: transition metal oxide, 7: circumferential wall, 8: plugging portion, 8a: inflow side plugging portion, 8b: outflow side plugging portion, 10: honeycomb structure body, 30: DPF, 40: DOC (upstream-side oxidation catalyst), 50: CSF, 60: urea injector, 70: SCR catalyst converter, 80 downstream-side oxidation catalyst, 100: exhaust-gas purifying system

What is claimed is:

1. A honeycomb structure, comprising: a honeycomb structure body including a porous partition wall having pores, the honeycomb structure body including a plurality of cells defined by the partition wall and serving as a through channel of an exhaust gas; and a plugging portion to alternately plug open end parts of the plurality of cells on one side as an inflow side of the exhaust gas and open end parts on the other side as an outflow side of the exhaust gas, wherein the plurality of cells includes inflow cells that are open at the open end parts on the inflow side and outflow cells that are open at the open end parts on the outflow side, the partition wall has porosity of 70% or less, the partition wall is loaded, on the side of the outflow cells, with an oxidation catalyst consisting of a transition metal oxide loaded on $CeO_2$ to oxidize NO gas, wherein the transition metal oxide is selected from the group consisting of $MnO_2$ and $Co_3O_4$, the oxidation catalyst has a particle diameter of more than 1 μm and less than 50.0 μm, and the loading amount of the oxidation catalyst is 5.0 g/L or more and 50 g/L or less, wherein 60% or more of the transition metal oxide is loaded only on the partition wall from a ½ position in the thickness direction toward the side of the outflow cells.

2. The honeycomb structure according to claim 1, wherein the honeycomb structure has a $NO_2$ conversion rate at 250° C. that is more than 3.0% and less than 35%.

3. The honeycomb structure according to claim 1, wherein the oxidation catalyst has a specific surface area of from 78 m²/g to 112.5 m²/g.

4. The honeycomb structure according to claim 1, wherein 67% or more of the transition metal oxide is loaded only on the partition wall from a ½ position in the thickness direction toward the side of the outflow cells.

5. The honeycomb structure according to claim 1, wherein 69.8% or more of the transition metal oxide is loaded only on the partition wall from a ½ position in the thickness direction toward the side of the outflow cells.

* * * * *